United States Patent [19]
Hadeler et al.

[11] Patent Number: 4,890,025
[45] Date of Patent: Dec. 26, 1989

[54] ELECTRIC MOTOR HAVING A PROTECTOR SWITCH

[75] Inventors: Dieter Hadeler, Oldenburg; Alfred Appeldorn, Hatten-Sandkrug, both of Fed. Rep. of Germany

[73] Assignee: Licentia Patent-Verwaltungs-GmbH, Frankfurt, Fed. Rep. of Germany

[21] Appl. No.: 213,791

[22] Filed: Jul. 1, 1988

[30] Foreign Application Priority Data

Jul. 4, 1987 [DE] Fed. Rep. of Germany ....... 8709261

[51] Int. Cl.⁴ ............................................. H02K 11/00
[52] U.S. Cl. ..................... 310/68 C; 310/43; 310/71; 361/25
[58] Field of Search ............... 200/293, 294, 301; 310/43, 51, 71, 68 C, 91, 254, 261, 269, 68 R, 89; 361/25, 26, 27

[56] References Cited

U.S. PATENT DOCUMENTS 3,293,463 12/1966 Church ................................. 310/71
3,959,675 5/1976 Lautner et al. ..................... 310/68 C
4,061,935 12/1977 Kandpal ................................. 361/25
4,734,602 3/1988 Hauser et al. ..................... 310/68 C Primary Examiner—Peter S. Wong
Assistant Examiner—D. L. Rebsch
Attorney, Agent, or Firm—Spencer & Frank

[57] ABSTRACT

An electric motor having at least two salient stator poles equipped with windings, covering members inserted into gaps between the poles, and a protector switch associated with the field windings. The protector switch is mounted at a predetermined position on one of the covering members using a clamping element which is configured as an elongated component and which is provided with a receptacle for the housing of the protector switch and a holder for leads extending from the switch. The clamping member snaps into a recess in the cover member extending in the direction of the motor axis. The clamping element orients the protector switch so as to avoid contact chatter due to vibration of the motor.

24 Claims, 1 Drawing Sheet

1

ELECTRIC MOTOR HAVING A PROTECTOR SWITCH

BACKGROUND OF THE INVENTION

The present invention relates to an electric motor, particularly a commutator motor, of the type in which the gaps between the stator poles are closed off with respect to the stator bore by means of covering members. This type of motor is disclosed, for example German Offenlegungsschrift (unexamined, published application) in 3,008,937.

Additionally, it is generally customary to provide electric motors with a protector switch which is disposed near or within the field windings, and switches the field off if there is excess current or undue heating. In this application the term "protector switch" will be understood to mean an automatic electro-mechanical device having a pair of switch contacts which are normally electrically connected, and a sensor which is movable in response to a relevant physical parameter such as current or temperature and which electrically disconnects the contacts if the sensed parameter exceeds a predetermined value. The sensor may, for example, move the contacts apart to electrically disconnect them. Because of their configuration the protection switches used with motors are sensitive to vibrations, particularly with respect to their installed position relative to the direction of vibration of the motor at the installed position. For example, during AC operation of a commutator motor, and particularly if rotation of the rotor is blocked, relatively large rocking moments develop as a result of the reaction forces between the stator and the rotor, so that the stator oscillates about its axis at double the frequency of the driving current. These vibrations are of course also transferred to the protector switch fastened on the stator, and experience has shown that the switches are prone to contact chatter at least in certain installed positions of the switch contacts relative to the direction of vibration of the stator at the installed position. This occurs in a particularly undesirable manner whenever the direction of movement of the switch contacts is tangent to the direction of the stator axis, i.e. in the vibration direction. The rocking oscillations of the stator cause the switch contacts to perform switching movements in the rhythm of the vibrations, since the stator vibrations are transferred to them, so that the switch becomes useless very quickly.

SUMMARY OF THE INVENTION

It is an object of the present invention to mount the protector switch relative to the direction of vibration of the stator at the installed position in such a manner that rocking moments occurring in the stator can no longer excite the switch contacts to vibrate along the switching direction. This avoidance of chatter is to be attained without greater expenditures and within the scope of the conventional installation steps, possibly by means of automatic machinery.

According to the invention, this is accomplished essentially by an electric motor having at least two salient stator poles equipped with windings, between which there are pole gaps which are covered by inserted covering members, and having at least one protector switch associated with the field windings and mounted at a predetermined position to one of the covering members by a clamping element, the clamping element being configured as an elongate component which is provided with a receptacle for the housing of the protector switch and with a receptacle for its connecting leads and which can be inserted in a form-locking manner into and fastened in a recess of the covering element, the recess in the covering element extending in the direction of the motor axis.

The invention has the advantage that the installed position of the protector switch is permanently secured, with its installation being effected in such a manner that the direction of movement of the switch contacts is radial to the direction of the motor axis. In this way, the switch contacts are fixed in a position in which they cannot be excited to rhythmically open and close the switch when the stator performs rocking oscillations.

In an advantageous manner, the clamping element accommodating the protective switch is fastened in a recess or to projections or ribs of the covering member, with the fastening being effected by the mutual engagement of resilient projections or by means of detent hooks.

DESCRIPTION OF THE PREFERRED EMBODIMENT

A motor having a protector switch to avoid damage due to excess current or undue heating will now be described with reference to the drawings.

Figure 1:
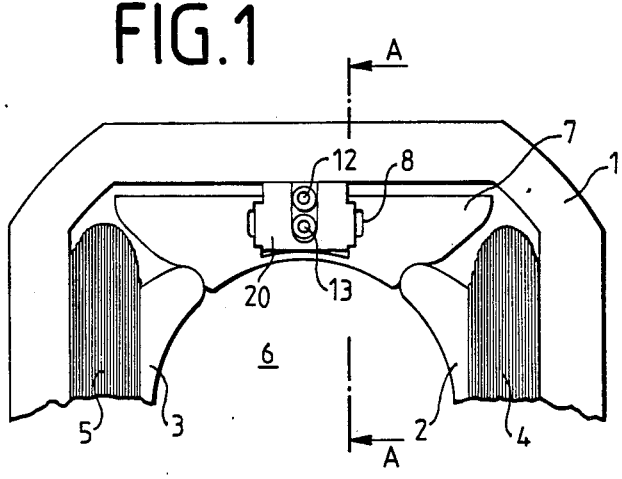
FIG. 1 an end view of a portion of a motor stator, with a covering member inserted into the pole gap and a clamping element disposed therein.

FIG. 1 is a detail view of a stator lamination packet 1, seen from its end, including two salient poles 2 and 3 equipped with windings 4 and 5, and rotor chamber 6. A covering element 7 which closes the pole gap is inserted between the pole horns of the two poles 2 and 3 so that it is locked into place. Covering element 7 is provided with a recess 8 in the center of the side of element 7 facing away from rotor chamber 6, for example. Recess 8 extends in the direction of the motor axis and is configured as a snap-in receptacle for a clamping element 9, which carries a protector switch 10 for the motor.

Figure 2:
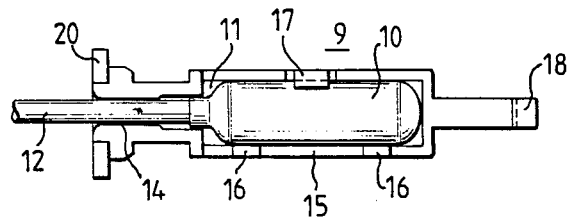
FIG. 2 is a top view of a clamping element with a protector switch mounted thereon.

FIG. 2 shows the clamping element 9 with the protector switch 10 mounted therein. The clamping element 9 is configured as an elongate component and includes a bottom member 11 for receiving the protector switch housing. As will be discussed, clamping element 9 also includes a holder for the connecting leads of the protector switch 10 following the bottom member 11, and fastening means for reliably fixing the clamping element 9 to the covering element 7.

In the illustrated embodiment, bottom member 11 is provided with a rim 15 and laterally encloses, at least in part, the protector switch 10 inserted therein up to about the height of half the diameter of switch 10.

Figure 3:
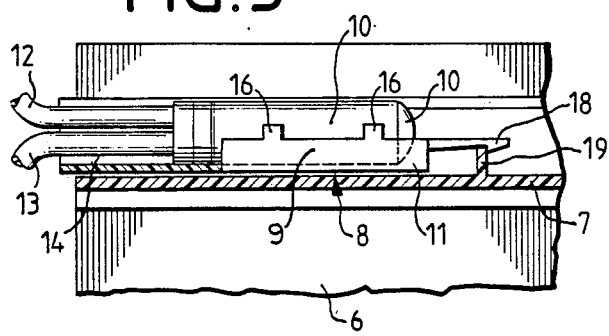
FIG. 3 is a side view, partially in section along line A—A of FIG. 1, of the clamping element inserted into the covering member.

FIG. 3 is a side view of the clamping element 9, partially in section along line A—A (FIG. 1), and shows the arrangement of clamping element 9 relative to the adjacent motor components. As can be seen from FIGS. 2 and 3, the guide 14 for connecting leads 12 and 13 prevents the protector switch 10 from being inserted into the clamping element 9 in any position other than a predetermined position which orients the direction of movement of the switch contacts (not shown) radially with respect to the direction of the motor axis. Connecting leads 12 and 13 can only be inserted into guide 14 radially (with respect to the motor axis), one behind the other. This ensures that connecting leads 12 and 13, which exit from the housing of the protector switch 10 in a certain arrangement relative to the position of the switch contacts, fix the protector switch 10 in the predetermined position on clamping element 9. As a result, contact chatter does not arise even if stator 1 undergoes rocking oscillations during operation of the motor.

The rim 15 of bottom member 11 extends upwardly in the manner of a trough. In the illustrated embodiment, one side of rim 15 is provided with projections 16 and the other side is provided with a detent hook 17, which partially grips over the housing of protector switch 10. In this way, the protector switch 10 is fixed in the clamping element 9 and can easily be mounted in its receptacle by simply pressing it in.

The free end of clamping element 9, opposite the leads 12 and 13, is provided with a detent hook arrangement 18 which engages a projection 19 within recess 8. This engagement prevents axial displacement of clamping element 9, whose cover plate 20 rests on the surface of stator packet 1 or of covering member 7.

The present invention is not limited to the illustrated embodiment. For example, if the position of the contacts in the protector switch with respect to the leads were different, receptacle 14 might be configured so that the leads could only be inserted next to one another in a direction tangent to the motor circumference. The recess 8 might also be changed to another location in the covering member, perhaps closer to the windings. A plurality of protector switches could be provided. The number and arrangement of projections 16 and/or 17 and the arrangement of rim 15 can also be adapted to correspond to other configurations specific to the particular type of the housing of the protector switch.

Clamping element 9 is preferably manufactured of a thermoplastic synthetic material by an injection molding process.

The present disclosure relates to the subject matter disclosed in Federal Republic of Germany application number G 87 09 261.1 of July 4th, 1987, the entire disclosure of which is incorporated herein by reference.

It will be understood that the above description of the present invention is susceptible to various modifications, changes, and adaptations, and the same are intended to be comprehended within the meaning and range of equivalents of the appended claims.

What we claim is:

1. An electric motor having an axis, comprising:
two salient stator poles spaced apart by a pole gap, the poles having windings;
a covering element inserted into the pole gap, the covering element having a recess extending in the direction of the motor axis and having a securing portion, the securing portion including a projection which extends into the recess;
a protector switch associated with the windings, the protector switch having a housing and leads; and
means for mounting the protector switch at a predetermined position on the covering element, the means for mounting including an elongated clamping element which fits into the recess in the covering element and which has an end, the clamping element including receptacle means for providing a receptacle for the housing of the protector switch, holder means for providing a holder for the leads, and locking means, including a latch member which automatically engages the securing portion when the clamping element is inserted into the recess of the covering element, for engaging the covering element to retain the clamping element in the recess,
wherein the latch member includes a detent hook at the end of the clamping member, the hook gripping behind the projection.

2. An electric motor having an axis, comprising:
two salient stator poles spaced apart by a pole gap, the poles having windings;
a covering element inserted into the pole gap, the covering element having a recess extending in the direction of the motor axis;
a protector switch associated with the windings, the protector switch having a housing and leads; and
means for mounting the protector switch at a predetermined position on the covering element, the means for mounting including an elongated clamping element which fits into the recess in the covering element, the clamping element including receptacle means for providing a receptacle for the housing of the protector switch, holder means for providing a holder for the leads, and locking means for engaging the covering element to retain the clamping element in the recess,
wherein the receptacle means includes a flat bottom plate having edges, and means connected to the edges for gripping the protector switch, the means for gripping including a rim which cooperates with the bottom plate to form a trough, and projections on the rim.

3. The motor of claim 2, wherein the bottom plate is rectangular.

4. The motor of claim 2, wherein the receptacle means comprises a flat bottom plate having edges, and means connected to the edges for gripping the protector switch.

5. The motor of claim 2 wherein the means for gripping further comprises at least one detent hook.

6. The motor of claim 1, wherein the clamping element is a unitary injection-molded thermoplastic element.

7. The motor of claim 4, wherein the bottom plate is rectangular.

8. The motor of claim 2, wherein the means for gripping further comprises a detent hook connected to the rim.

9. The motor of claim 2, wherein the holder means comprises a guide integrally connected to the bottom plate, the leads being inserted through the guide.

10. The motor of claim 9, wherein the guide is dimensioned so that the leads can only be inserted through the guide while positioned in a predetermined orientation.

11. The motor of claim 9, wherein the guide is dimensioned so that the leads can only be inserted one above the other, radial with respect to the motor axis.

12. The motor of claim 9, wherein the guide is dimensioned so that the leads can only be inserted in mutually parallel juxtaposition with r to the motor axis.

13. The motor of claim 2, wherein the covering element includes a securing portion, and wherein the locking means comprises a latch member which automatically engages the securing portion when the clamping element is inserted into the recess of the covering element.

14. The motor of claim 13, wherein the securing portion comprises a projection which extends into the recess, wherein the clamping element has an end, and wherein the latch member comprises a detent hook at the end of the clamping member, the hook gripping behind the projection.

15. The motor of claim 2 wherein the clamping element is a unitary injection-molded thermoplastic element.

16. The motor of claim 4, wherein the means for gripping comprises at least one projection.

17. The motor of claim 16, wherein the means for gripping further comprises at least one additional detent hook.

18. The motor of claim 4, wherein the means for gripping comprises at least one additional detent hook.

19. The motor of claim 4, wherein the means for gripping comprises a rim which cooperates with the bottom plate to form a trough, and projections on the rim.

20. The motor of claim 19, wherein the means for gripping further comprises an additional detent hook connected to the rim.

21. The motor of claim 4, wherein the holder means comprises a guide integrally connected to the bottom plate, the leads being inserted through the guide.

22. The motor of claim 21, wherein the guide is dimensioned so that the leads can only be inserted through the guide while positioned in a predetermined orientation.

23. The motor of claim 21, wherein the guide is dimensioned so that the leads can only be inserted one above the other, radial with respect to the motor axis.

24. The motor of claim 21, wherein the guide is dimensioned so that the leads can only be inserted in mutually parallel juxtaposition with respect to the motor axis.

* * * * *